J. NEILL.
METHOD OF CUTTING FILES.
APPLICATION FILED MAR. 3, 1910.

998,380.

Patented July 18, 1911.

Witnesses:
H. D. Penney
A. B. Mattingly.

Inventor;
James Neill.
By his Attorney,

UNITED STATES PATENT OFFICE.

JAMES NEILL, OF SHEFFIELD, ENGLAND.

METHOD OF CUTTING FILES.

998,380.  Specification of Letters Patent.  Patented July 18, 1911.

Application filed March 3, 1910. Serial No. 547,069.

*To all whom it may concern:*

Be it known that I, JAMES NEILL, a subject of the King of Great Britain, residing in Sheffield, England, have invented certain new and useful Improvements in Methods of Cutting Abrasive Files, of which the following is a specification.

This invention relates to an improved method of cutting abrasive files, and it refers particularly to that class of files in which the teeth are so widely pitched and are of such depth that it has hitherto been customary to form them by the positive removal of the metal, and by means of a milling cutter or similar tool. Now, in accordance with the present invention, instead of forming the teeth as above described I produce the teeth upon a blank formed of composite metal, that is to say, a blank produced by welding a hard and soft layer of steel together. The two metals are first cast and when the metal is set the other portion is added and the two bodies adhere. The body of composite metal thus produced is then hammered under a steam hammer and then finally rolled to the desired shape. By this means there is produced a blank with a surface or layer of hard steel and a layer of softer metal, the said softer metal forming a backing for the harder. In order to form the teeth the harder metal is severed or partly severed, and during the partial or complete severance of said hard metal, the soft portion is allowed to stretch or elongate so that widely pitched teeth are produced having the appearance of a milled tooth. The file after the cutting is completed may be tempered in any well-known manner.

In order that the invention may be the better understood, drawings are appended in which:—

Figure 1:
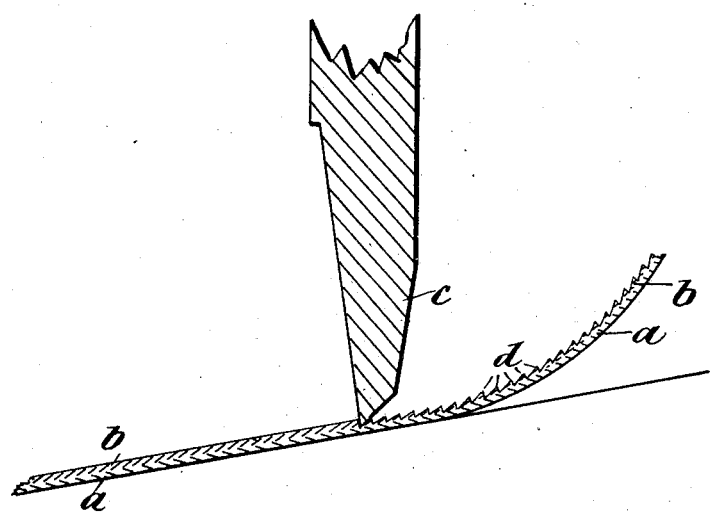
Figure 2:

Figure 1 is a longitudinal section of a blank having the teeth at one end. Fig. 2 is a cross section.

Referring to the accompanying drawings, $a$ indicates the layer of soft steel, and $b$ the layer of hard steel which as shown in the drawings is completely severed by the tool $c$ to form the teeth $d$, and during the cutting operation the softer layer is caused to elongate. This elongation of the softer layer in practice causes the blank to turn or curl up as shown in Fig. 1, so that before tempering, the blank requires to be straightened.

Having now particularly described and ascertained the nature of my said invention, and in what manner the same is to be performed, I declare that what I claim is:—

A method of producing abrasive files having widely spaced teeth in which a blank is employed comprising a body formed of a layer of hard metal and a layer of softer metal, the desired spacing of the teeth being produced by incising the harder layer to form the teeth and permitting the softer layer to elongate.

In witness whereof I have hereunto set my hand in the presence of two witnesses.

JAMES NEILL.

Witnesses:
ROBERT A. WENT,
ERNEST HUGHES.

Copies of this patent may be obtained for five cents each, by addressing the "Commissioner of Patents, Washington, D. C."